United States Patent [19]

Dehennau et al.

[11] Patent Number: 5,124,409
[45] Date of Patent: Jun. 23, 1992

[54] PROCESS FOR RENDERING MIXTURES COMPRISING AT LEAST ONE VINYL CHLORIDE-BASED RESIN AND AT LEAST ONE OLEFIN-BASED RESIN COMPATIBLE

[75] Inventors: Claude Dehennau; Thierry Depireux, both of Waterloo, Belgium

[73] Assignee: Solvay & Cie (Société Anonyme), Brussels, Belgium

[21] Appl. No.: 718,802

[22] Filed: Jun. 21, 1991

[30] Foreign Application Priority Data

Jun. 22, 1990 [BE] Belgium .............................. 09000643

[51] Int. Cl.⁵ ...................... C08L 27/06; C08L 27/08; C08L 23/00; C08L 33/04
[52] U.S. Cl. .................... 525/222; 525/239; 525/240
[58] Field of Search ........................ 525/222, 239, 240

[56] References Cited

FOREIGN PATENT DOCUMENTS 654248 10/1964 Belgium .

OTHER PUBLICATIONS

Database WPI, No. 73-47676U, Derwent Publ. Ltd. London GB & JP-B-51 047 180, Japan Steel Works Ltd., Dec. 14, 1976.
Journal of vinyl Technology, vol. 2, No. 4, Dec. 1980, pp. 218-221; Bodaille et al.; "Polymer Reprocessing: Properties . . . ".

Primary Examiner—James J. Seidleck
Assistant Examiner—W. R. H. Clark
Attorney, Agent, or Firm—Spencer, Frank & Schneider

[57] ABSTRACT

A mixture is produced, comprising from 50 to 95% by weight of at least one vinyl chloride-based resin, from 1 to 20% by weight of at least one olefin-based resin, from 1 to 20% by weight of a copolymer of ethylene and vinyl acetate which has a vinyl acetate content of between 10 and 35% and from 2 to 40% by weight of a copolymer of ethylene and vinyl acetate which has a vinyl acetate content of between 60 and 95%, and the product thus obtained is then processed.

The process makes it possible in particular to produce sheets which have good mechanical properties and which have a remarkable transparency.

10 Claims, No Drawings

PROCESS FOR RENDERING MIXTURES COMPRISING AT LEAST ONE VINYL CHLORIDE-BASED RESIN AND AT LEAST ONE OLEFIN-BASED RESIN COMPATIBLE

The present invention relates to a process for rendering mixtures comprising at least one vinyl chloride-based resin and at least one olefin-based resin compatible.

For economic and ecological reasons it is highly desirable to have the ability to recover and recycle wastes originating from the thermoplastics industry.

However, one of the major difficulties encountered during attempts to recover and to recycle these wastes stems from the fact that the latter do not consist of a single thermoplastic but of a group of thermoplastics which are frequently mutually incompatible.

Thus, for example, it is common knowledge that vinyl chloride-based resins, taken within a very broad meaning, are incompatible with olefin-based resins. Now, resins of these two types are very widely employed in the plastics industry and are therefore encountered in very high proportions in the wastes resulting from this industry.

It has now been found that it is possible to render wastes of vinyl chloride-based resins and of olefin-based resins compatible and to produce from such mixtures articles such as sheets exhibiting excellent properties and good transparency.

The present invention consequently relates to a process for rendering mixtures comprising at least one vinyl chloride-based resin and at least one olefin-based resin compatible, which process is characterised in that a mixture is produced comprising from 50 to 95% by weight of at least one vinyl chloride-based resin, from 1 to 20% by weight of at least one olefin-based resin, from 1 to 20% by weight of a copolymer of ethylene and vinyl acetate which has a vinyl acetate content of between 10 and 35% and from 2 to 40% by weight of a copolymer of ethylene and vinyl acetate which has a vinyl acetate content of between 60 and 95%, and in that the mixture thus produced is then processed.

A vinyl chloride-based resin is intended to refer to vinyl chloride homopolymers and vinyl chloride copolymers containing at least 70% by weight of vinyl chloride-derived units, the comonomer(s) employed for the production of the latter being chosen from the group made up of olefins such as ethylene, propylene or styrene and esters such as vinyl acetate and alkyl acrylates and methacrylates. As a general rule, however, preference is given to resins based on vinyl chloride homopolymers.

An olefin-based resin is intended to refer to alpha-olefin homopolymers such as polypropylene or low- or high-density polyethylene and copolymers containing at least 70% by weight of units derived from alpha-olefins. As a general rule, however, preference is given to ethylene homopolymers and, in particular, to low-density (0.915 to 0.930) polyethylene.

The best results are achieved by incorporating into the mixture of vinyl chloride-based resin(s) and olefin-based resin(s) from 1 to 10% by weight of a copolymer of ethylene and vinyl acetate which has a vinyl acetate content of between 20 and 30% and from 10 to 30% by weight of a copolymer of ethylene and vinyl acetate which has a vinyl acetate content of between 65 and 85%.

The mixture of vinyl chloride-based resin(s) and of olefin-based resin(s) may also contain small proportions of other thermoplastic resins such as especially polystyrene or of vinylidene chloride-based resins. Thus, for example, it has been found that the mixture may optionally contain from 1 to 20 parts by weight of vinylidene chloride-based resins (copolymers of vinylidene chloride and vinyl chloride or of acrylic or methacrylic esters).

The incorporation of the copolymers of ethylene and vinyl acetate in the mixture may be advantageously carried out by hot mixing in a conventional apparatus and the processing of the mixture thus obtained can be carried out in conventional equipment such as presses, extruders or calenders.

It is quite obvious that it may be advantageous to incorporate usual additives such as plasticisers, stabilisers, lubricants and the like in the mixture before it is processed.

The process in accordance with the present invention is additionally illustrated in greater detail in the examplary embodiments which follow.

EXAMPLE 1

Into a hot mixer are introduced:
68 parts by weight of stabilised polyvinyl chloride (K value =58);
4.5 parts by weight of low-density polyethylene;
23 parts by weight of a copolymer of ethylene and vinyl acetate which has a vinyl acetate content of 65%;
4.5 parts by weight of a copolymer of ethylene and vinyl acetate which has a vinyl acetate content of 28%.

After mixing, the mixture obtained is pressed to obtain a sheet from which a sample given reference A is taken.

EXAMPLE 2R

By way of a comparative test, example 1 is repeated but introducing only the polyvinyl chloride and the low-density polyethylene into the hot mixer and, after the mixture has been pressed, a sample given reference B is taken from the sheet produced.

EXAMPLE 3R

By way of a comparative test, example 1 is repeated but introducing only the polyvinyl chloride, the low-density polyethylene and the copolymer of ethylene and vinyl acetate which has a vinyl acetate content of 65%. The sample taken from the sheet which is then produced by pressing is given reference C.

EXAMPLE 4R

By way of a comparative test, example 1 is repeated but introducing only the polyvinyl chloride, the low-density polyethylene and the copolymer of ethylene and vinyl acetate which has an acetate content of 28%. The sample taken from the sheet which is then produced by pressing is given reference D.

A microtome section of samples A, B, C and D is then subjected to a micrographic examination between crossed nicols so as to establish the dimensions of the polyethylene particles. It is thus found that the dimensions of the particles seen in the sample A, obtained according to the process in accordance with the invention, are markedly smaller than those of the samples B, C and D, which are excluded from the scope of the invention. In fact, sample B contains particles of much larger dimensions than those of samples A, C and D, but the maximum dispersion and reduction of the particles is seen in sample A.

In addition, the various samples are subjected to a test for tensile resilience at 23° C. (unnotched specimens, pendulum energy 75 kg/cm). The table below reproduces the mean results calculated on 5 specimens.

| Sample | Tensile resilience (kJ/m$^2$) |
|---|---|
| A | 107 |
| B | 26 |
| C | 46 |
| D | 33 |

The table shows that the product obtained according to the process of the invention has a much higher tensile resilience.

EXAMPLE 5

Into a hot mixer are introduced 100 parts by weight of wastes of polyvinyl chloride sheets lined with a low-density polyethylene film by means of an adhesive consisting of a copolymer of ethylene and vinyl acetate containing 28% of vinyl acetate, 3 parts by weight of a tin-based stabiliser and 30 parts by weight of a copolymer of ethylene and vinyl acetate which has a vinyl acetate content of 68% (sold by Farbenfabrik Bayer under the name Baymod KL3-2418) so that the mixed composition contains 68.5% by weight of stabilised polyvinyl chloride, 4.3% by weight of low-density polyethylene, 4.7% by weight of a copolymer of ethylene and vinyl acetate which has a vinyl acetate content of 28%, and 22.5% by weight of a copolymer of ethylene and vinyl acetate which has a vinyl acetate content of 68%.

The mixed composition is then pressed to produce a sheet which is characterised by a remarkable transparency (a gain in absorbance of 47% when compared with a sheet produced from a similar composition but in which the copolymer of high vinyl acetate content has been replaced with an equivalent quantity of polyvinyl chloride).

In addition, the tensile resilience of the product obtained is 159 kJ/m$^2$.

By way of comparison, the tensile resilience of a sheet produced solely from the sheet wastes and therefore without incorporating any copolymer of ethylene and vinyl acetate of high vinyl acetate content is only 84 kJ/m$^2$:

EXAMPLE 6

Into a hot mixer are introduced:
100 parts by weight of scraps of composite sheets comprising in succession:
  a polyvinyl chloride layer;
  a polyvinylidene chloride layer;
  a polyvinyl chloride layer;
  a film of adhesive consisting of a copolymer of ethylene and vinyl acetate which has a vinyl acetate content of 28%;
  a polyethylene layer;
20 parts by weight of a copolymer of ethylene and vinyl acetate which has a vinyl acetate content of 65%;
1 part by weight of a stabiliser for polyvinylidene chloride, so that the mixed composition contains 68.5% by weight of polyvinyl chloride, 7.5% by weight of stabilised polyvinylidene chloride, 7.5% by weight of polyethylene, 2% by weight of a copolymer of ethylene and vinyl acetate of low vinyl acetate content and 16.5% by weight of a copolymer of ethylene and vinyl acetate of high vinyl acetate content.

The mixed composition is then pressed to produce a sheet which is characterised by a remarkable transparency.

In addition, the tensile resilience of the product obtained is 195 kJ/m$^2$.

By way of comparison, the tensile resilience of a sheet produced solely from the sheet wastes and therefore without incorporating any copolymer of ethylene of high vinyl acetate content is only 70 kJ/m$^2$.

We claim:

1. Process for rendering mixtures comprising at least one vinyl chloride-based resin and at least one olefin-based resin compatible, characterised by producing a mixture which comprises from 50 to 95% by weight of at least one vinyl chloride-based resin, from 1 to 20% by weight of at least one olefin-based resin, from 1 to 20% by weight of a copolymer of ethylene and vinyl acetate which has a vinyl acetate content of between 10 and 35% and from 2 to 40% by weight of a copolymer of ethylene and vinyl acetate which has a vinyl acetate content of between 60 and 95%.

2. Process according to claim 1, characterised in that the mixture additionally contains from 1 to 20% by weight of vinylidene chloride-based resins.

3. Process according to claim 1, characterised in that the mixture contains from 1 to 10% by weight of a copolymer of ethylene and vinyl acetate which has a vinyl acetate content of between 20 and 30% and from 10 to 30% by weight of a copolymer of ethylene and vinyl acetate which has a vinyl acetate content of between 65 and 85%.

4. Process according to claim 1, characterised in that the vinyl chloride-based resin is polyvinyl chloride.

5. Process according to claim 1, characterised in that the olefin-based resin is an ethylene homopolymer.

6. Process according to characterised in that the copolymers of ethylene and vinyl acetate are incorporated in the mixture by hot mixing.

7. Process according to claim 2, characterised in that the copolymers of ethylene and vinyl acetate are incorporated in the mixture by hot mixing.

8. Process according to claim 3, characterised in that the ocpolymers of ethylene and vinyl acetate are incorporated in the mixture by hot mixing.

9. Process according to claim 4, characterised in that the copolymers of ethylene and vinyl acetate are incorporated n the mixture by hot mixing.

10. Process according to claim 5, characterised in that the copolymers of ethylene and vinyl acetate are incorporated in the mixture by hot mixing.

* * * * *